(12) United States Patent
Chalmers et al.

(10) Patent No.: US 12,480,497 B2
(45) Date of Patent: Nov. 25, 2025

(54) MODULAR CRYOGENIC PERMANENT MAGNET ELECTRICAL MOTORS AND GENERATORS FOR SUBMERGED MOTOR PUMPS AND TURBINES AND RELATED SYSTEMS AND METHODS

(71) Applicant: Flowserve US Company, Irving, TX (US)

(72) Inventors: Dennis W. Chalmers, Lake Havasu City, AZ (US); Mina M. Botrous, Lake Havasu City, AZ (US); Ed Ortiz Pedroza, Lake Havasu City, AZ (US)

(73) Assignee: Flowserve US Company, Irving, TX (US)

( * ) Notice: Subject to any disclaimer, the term of this patent is extended or adjusted under 35 U.S.C. 154(b) by 0 days.

(21) Appl. No.: 18/674,184

(22) Filed: May 24, 2024

(65) Prior Publication Data

US 2024/0392789 A1    Nov. 28, 2024

Related U.S. Application Data

(60) Provisional application No. 63/468,960, filed on May 25, 2023.

(51) Int. Cl.
| | | |
|---|---|---|
| *F04D 13/06* | (2006.01) | |
| *F04D 9/02* | (2006.01) | |
| *F04D 13/08* | (2006.01) | |
| *F04D 29/22* | (2006.01) | |
| *H02K 7/08* | (2006.01) | |
| *H02K 55/02* | (2006.01) | |

(52) U.S. Cl.
CPC .............. *F04D 13/08* (2013.01); *F04D 9/02* (2013.01); *F04D 29/2277* (2013.01); *H02K 7/083* (2013.01); *H02K 55/02* (2013.01); *H02K 2213/12* (2013.01)

(58) Field of Classification Search
CPC ........ F04D 13/08; F04D 9/02; F04D 29/2277; H02K 7/083; H02K 55/02; H02K 2213/12
See application file for complete search history.

(56) References Cited

U.S. PATENT DOCUMENTS

| | | |
|---|---|---|
| 3,304,877 A | 2/1967 | Carter |
| 3,369,715 A | 2/1968 | Carter |
| 3,652,186 A | 3/1972 | Carter |
| 3,764,236 A | 10/1973 | Carter |

(Continued)

FOREIGN PATENT DOCUMENTS

| | | |
|---|---|---|
| CN | 111852893 | 10/2020 |
| CN | 111852893 A | * 10/2020 |

(Continued)

OTHER PUBLICATIONS

English Translation CN-111852893-A (Year: 2013).*

(Continued)

*Primary Examiner* — Shafiq Mian
(74) *Attorney, Agent, or Firm* — BKRIP LLC (57) ABSTRACT

Motors, pumps, generators, fluid-handling devices, and related systems or methods may include a motor assembly comprising a motor housing and a motor comprising a rotor and a stator contained in the motor housing. The motor further comprises an alternating current medium voltage synchronous motor.

20 Claims, 4 Drawing Sheets

(56) References Cited

U.S. PATENT DOCUMENTS

| | | |
|---|---|---|
| 3,975,117 A | 8/1976 | Carter |
| RE31,445 E | 11/1983 | Carter |
| 5,386,708 A | 2/1995 | Kishorenath |
| 6,167,724 B1 | 1/2001 | Pozivil |
| 6,255,752 B1 | 7/2001 | Werner |
| 6,655,930 B2 | 12/2003 | Sato |
| 6,659,730 B2 | 12/2003 | Gram |
| 6,902,378 B2 | 6/2005 | Gaudet |
| 7,063,512 B2 | 6/2006 | Haesloop |
| 7,207,767 B2 | 4/2007 | Ashihara |
| 7,455,497 B2 | 11/2008 | Lee |
| 8,162,596 B1 | 4/2012 | Kamio |
| 8,240,976 B1 | 8/2012 | Kamio |
| 8,253,292 B2 | 8/2012 | Kamio |
| 8,397,506 B1 | 3/2013 | Wright |
| 8,506,236 B2 | 8/2013 | Alison-Youel |
| 8,550,771 B2 | 10/2013 | Kilkenny |
| 8,656,726 B2 | 2/2014 | Pozivil |
| 8,664,785 B2 | 3/2014 | Madison |
| 8,823,189 B2 | 9/2014 | Madison |
| 8,955,339 B2 | 2/2015 | Kohler |
| 8,963,354 B2 | 2/2015 | Madison |
| 9,054,568 B2 | 6/2015 | Kori |
| 9,091,277 B1 | 7/2015 | Young |
| 9,341,085 B2 | 5/2016 | Madison |
| 9,461,519 B2 | 10/2016 | Madison |
| 9,476,314 B2 | 10/2016 | Besson |
| 9,478,965 B2 | 10/2016 | Chalmers |
| 9,534,576 B2 | 1/2017 | Sun |
| 9,546,647 B2 | 1/2017 | Longsworth |
| 9,562,533 B2 | 2/2017 | Johchi |
| 9,631,622 B2 | 4/2017 | Kilkenny |
| 9,759,083 B2 | 9/2017 | Sgambati |
| 10,030,815 B2 | 7/2018 | Fuchs |
| 10,175,092 B2 | 1/2019 | Wahl |
| 10,267,315 B2 | 4/2019 | Chalmers |
| 10,816,140 B2 | 10/2020 | De Nardis |
| 10,914,516 B2 | 2/2021 | Ragot |
| 10,954,952 B2 | 3/2021 | Boeglin |
| 2008/0122226 A1 | 5/2008 | Madison |
| 2009/0004032 A1 | 1/2009 | Kaupert |
| 2009/0031754 A1 | 2/2009 | Ushitora |
| 2013/0283824 A1 | 10/2013 | Madison |
| 2015/0143822 A1* | 5/2015 | Chalmers ............... F04D 13/06 417/424.2 |
| 2016/0090864 A1 | 3/2016 | Finley |
| 2016/0216010 A1 | 7/2016 | Longsworth |
| 2019/0293067 A1 | 9/2019 | Bonvilain |
| 2020/0149434 A1 | 5/2020 | Spadacini |
| 2023/0141770 A1* | 5/2023 | De Maziere ............ F16H 15/38 475/115 |

FOREIGN PATENT DOCUMENTS

| | | | |
|---|---|---|---|
| CN | 116123102 | 5/2023 | |
| CN | 116123102 A * | 5/2023 | ............. F04D 13/06 |
| EP | 2250454 A2 | 11/2010 | |
| EP | 3026269 A1 | 6/2016 | |
| EP | 3739210 A1 | 11/2020 | |
| JP | 2001207989 A * | 8/2001 | |
| JP | 2005139964 A | 6/2005 | |
| JP | 2009191730 A | 8/2009 | |
| JP | 2011047301 A | 3/2011 | |
| KR | 100641569 | 11/2006 | |
| KR | 101064574 | 9/2011 | |

OTHER PUBLICATIONS

English Translation JP-2001207989-A (Year: 2001).*
English Translation CN-116123102-A (Year: 2023).*
The LNG Process Chain, downloaded May 5, 2021, 8 pages.
Ebara International Corporation Cryodynamics Division, downloaded May 5, 2021, 20 pages.
International Search Report and Written Opinion for PCT/US2024/031126, Oct. 8, 2024, 14 pages.

* cited by examiner

MODULAR CRYOGENIC PERMANENT MAGNET ELECTRICAL MOTORS AND GENERATORS FOR SUBMERGED MOTOR PUMPS AND TURBINES AND RELATED SYSTEMS AND METHODS

CROSS REFERENCE TO RELATED APPLICATIONS

This application claims the benefit of the filing date of U.S. Provisional Patent Application Ser. No. 63/468,960, titled "MODULAR CRYOGENIC PERMANENT MAGNET ELECTRICAL MOTORS AND GENERATORS FOR SUBMERGED MOTOR PUMPS AND TURBINES AND RELATED SYSTEMS AND METHODS," filed May 25, 2023, the disclosure of which is incorporated herein in its entirety by reference.

TECHNICAL FIELD

The present disclosure relates generally to motors for fluid handling devices, such as submerged motor pumps and cryogenic energy recovery turbines. More particularly, embodiments of the present disclosure relate to medium voltage permanent magnet motors/generators for submerged motor pumps and/or cryogenic energy recovery turbines that may be used in the liquefaction, transportation and regasification of refrigerated methane liquid, liquefied natural gas, and/or related light hydrocarbon liquids or other fluids and related systems and methods.

BACKGROUND

Industrial processes often involve hydraulic systems including pumps, energy recovery devices, etc. Pumps may be used to control the flow of the fluids used in the hydraulic processes. For example, some pumps may be used to increase (e.g., boost) the pressure in the hydraulic system, while other pumps may be used to move the fluids from one location to another. In a reverse function of the pump, energy recovery devices (e.g., turbines) may be used to capture energy from the process fluid.

Such devices may be implemented in cryogenic applications including, for example, the liquefaction, transportation and regasification of refrigerated methane liquid, liquefied natural gas (LNG), and/or related light hydrocarbon liquids. For example, cryogenic submerged pumps may be used in the LNG supply industry where pumps are used to transfer the product from storage tanks to LNG carriers at the production plant, from the carriers to shore-side storage tanks and then pumped at high pressure through vaporizers to pipelines.

The motors in current use in cryogenic submerged motor pumps were derived from the medium voltage air-cooled vertical hollow-shaft induction motors developed by U.S. Electric Motor Corporation in the 1960's and 1970's. The systems and coil insulation systems were adapted to permit operation in the cryogenic fluid environment. However, the small size of the market limited the overall amount of research and development funding. Consequently, extensive development was not generally feasible resulting in the motor technology being far from optimum in terms of operating cost in comparison to products used in larger markets. Accordingly, the technology advanced little over the following four decades.

Since 2002, motor bearing and insulation life and rotor problems have crowded out any new developments in submerged motor pumps (SMP) motor and cryogenic energy recovery turbines (CERT) generator design, basically placing the Engineering emphasis on short term problem solving.

BRIEF SUMMARY

In some aspects, the techniques described herein relate to a motor assembly for use in fluid handling device, including: a motor housing; a motor including a rotor and a stator contained in the motor housing, the motor including an alternating current medium voltage synchronous motor; a first bearing assembly coupled to a first end of the motor housing; and a second bearing assembly coupled to a second end of the motor housing and positioned at least partially within the motor housing.

In some aspects, the techniques described herein relate to a submergible cryogenic pump including: fluid handling stages including impellers mounted to a shaft at least partially encompassed by one or more diffusers; and a motor assembly for transferring force to and/or receiving force from the fluid handling stages via the shaft, the motor assembly including: a motor housing; and a motor including a rotor and a stator contained in the motor housing, the motor further including an alternating current medium voltage synchronous motor configured to be driven at 1,000 Volts to 15,000 Volts and at a rotational speed between 2,000 RPM and 10,000 RPM.

In some aspects, the techniques described herein relate to a method of transferring electrical energy between a motor assembly and a fluid handling device, the method including: moving a plurality of fluid handling stages including impellers mounted to a shaft at least partially within one or more diffusers; supporting the shaft with a first bearing assembly including a radial bearing and a second bearing assembly including at least two angled bearings for supporting loads in both axial directions of the shaft; and transferring force to and/or receiving force from the plurality of fluid handling stages via the shaft with a motor assembly including an alternating current medium voltage synchronous motor.

In some aspects, the techniques described herein relate to a motor assembly for use in fluid handling device, including: a motor housing; a motor including a rotor and a stator contained in the motor housing, the motor further including an alternating current medium voltage synchronous motor configured to be driven at 1,000 Volts to 15,000 Volts; an upper bearing assembly coupled to and/or supporting a first end of the rotor within the housing; and a lower bearing assembly coupled to and/or supporting a second end of the rotor within the housing.

In some aspects, the techniques described herein relate to a motor assembly, wherein the upper bearing assembly includes a radial guide bearing the lower bearing assembly includes one or more thrust bearings configured to support an axial force applied to the rotor.

In some aspects, the techniques described herein relate to a motor assembly, wherein the alternating current medium voltage synchronous motor is configured to be driven at 3,300 Volts to 6,600 Volts.

In some aspects, the techniques described herein relate to a motor assembly, wherein the alternating current medium voltage synchronous motor is configured to be driven by a variable frequency drive.

In some aspects, the techniques described herein relate to a motor assembly, wherein the motor housing is configured to be installed and/or removed as a unit in a submergible cryogenic pump.

In some aspects, the techniques described herein relate to a motor assembly for use in fluid handling device, including: a motor housing; a motor including a rotor and a stator contained in the motor housing, the motor further including an alternating current medium voltage synchronous motor; an upper bearing assembly coupled to a first end of the rotor within the housing; and a lower bearing assembly coupled to a second end of the rotor within the housing, the lower bearing assembly includes one or more thrust bearings configured to support an axial force applied to the rotor.

In some aspects, the techniques described herein relate to a motor assembly, wherein the lower bearing assembly includes two angular contact or thrust bearings positioned in opposition to support axial forces applied to the rotor in both axial directions.

In some aspects, the techniques described herein relate to a motor assembly, further including an active thrust balance system configured to at least partially counteract one or more axial forces applied to the rotor.

In some aspects, the techniques described herein relate to a motor assembly, pump, or fluid handling device, wherein the motor is configured to operate as a power generator without any substantial external electrical power being supplied to the motor.

In some aspects, the techniques described herein relate to a motor assembly for use in fluid handling device, including: a motor housing; and a motor including a rotor and a stator contained in the motor housing, the motor further including an alternating current medium voltage synchronous motor configured to be driven at 1,000 Volts to 15,000 Volts and at a rotational speed between 2,000 RPM and 10,000 RPM.

In some aspects, the techniques described herein relate to a motor assembly, wherein the alternating current medium voltage synchronous motor is configured to be driven with a variable frequency drive.

In some aspects, the techniques described herein relate to a motor assembly for use in fluid handling device, including: a motor housing; and a motor including a rotor and a stator contained in the motor housing, the motor further including an alternating current medium voltage synchronous motor configured to be driven at 1,000 Volts to 15,000 Volts and configured to be driven a variable frequency drive.

In some aspects, the techniques described herein relate to an alternating current, medium voltage synchronous motor or motor/generator or generator for use driving multistage pumps or liquid turbines that requires no externally-applied excitation of the rotor magnetic poles that is suitable for use when filled with, and submerged in in a refrigerated light hydrocarbon liquid such as methane, or ethane or propane, that can be modularly, decoupled and demounted from its connected hydraulic module, pump or turbine, for service or repair and be replaced by a similar module without affecting the serviceability of such hydraulic module.

In some aspects, the techniques described herein relate to an alternating current, medium voltage synchronous motor or motor generator or generator for use driving multistage pumps or liquid turbines that can be powered by, or can power, a variable speed power supply that permits the driven or driving units to operate in a rotative speed environment in excess of the traditional operating speed ranges normally associated with such equipment thereby reducing the capital and operating expenses associated with the use of such machines.

In some aspects, the techniques described herein relate to an alternating current, medium voltage synchronous motor or motor generator or generator for use driving multistage pumps or being driven by liquid turbines that can be controllably powered by or powering a variable speed power supply that permits the driven or driving units to operate in a rotative speed environment in excess of the traditional operating speed ranges normally associated with such equipment thereby reducing the capital and operating expenses associated with such machines.

In some aspects, the techniques described herein relate to an alternating current, medium voltage synchronous motor or motor generator or generator for use driving multistage pumps or liquid turbines which embodies a lower bearing included of a pair of angular antifriction rolling elements arranged such that one element opposes momentary upward forces, and the other element opposes momentary downward forces such as may occur in the event of transient hydrostatic/hydrodynamic and gravitational loads, during startup, restraining the vertical range of dynamic motion of the rotor that can be experienced when the machine, to approximately 2 mm.

In some aspects, the techniques described herein relate to a motor, generator, fluid handling system, and/or method as described herein.

In some aspects, the techniques described herein relate to a pumping and/or turbine system including a motor assembly as discussed above or below.

BRIEF DESCRIPTION OF THE DRAWINGS

While the specification concludes with claims particularly pointing out and distinctly claiming what are regarded as embodiments of the present disclosure, various features and advantages of embodiments of the disclosure may be more readily ascertained from the following description of example embodiments of the disclosure when read in conjunction with the accompanying drawings, in which:

DETAILED DESCRIPTION

The illustrations presented herein are not meant to be actual views of any particular fluid exchanger or component thereof, but are merely idealized representations employed to describe illustrative embodiments. The drawings are not necessarily to scale. Elements common between figures may retain the same numerical designation.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms "vertical" and "lateral" refer to the orientations as depicted in the figures.

As used herein, the term "substantially," "approximately," or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

As used herein, the term "fluid" may mean and include fluids of any type and composition. Fluids may take a liquid form, a gaseous form, or combinations thereof, and, in some instances, may include some solid material. In some embodiments, fluids may convert between a liquid form and a gaseous form during a cooling or heating process as described herein. In some embodiments, the term fluid includes gases, liquids, and/or pumpable mixtures of liquids and solids.

While embodiments of the disclosure may discuss LNG and/or related light hydrocarbon liquids, embodiments of the disclosure may also be used with other fluids, such as, for example, liquid hydrogen or liquid ammonia.

In some embodiments, embodiments of the disclosure may include a modular cryogenic motor/generator (e.g., a motor and/or generator). For example, a modular cryogenic medium voltage motor/generator may drive a pump or be driven by a turbine as part of a machine that is submerged in refrigerated light hydrocarbon such as methane, ethane propane, butane, or a mixture thereof, within a protective pressure vessel.

As discussed herein, such a motor and/or generator may be referenced as a motor where the motor may act as a generator when being powered or driven, for example, by the force of a fluid flow. Thus, it is understood that such a motor may not be externally powered and may be used primarily, or secondarily, as a generator.

The motors may be modular in the fact that the motor may be removed as a unit to be serviced and/or replaced. In conventional designs, the motor is generally integral with the pump with multiple components of the motor or drive system being separately installed and held within the housing of the pump. In embodiments of the disclosure, the motor unit may be integral to itself, for example, with self-contained bearing assemblies that are resident in the motor housing. Accordingly, the motor may be removed as a unit along with the bearings and/or along with other motor components, enabling relatively easier repair and/or replacement.

Furthermore, the modular arrangement of the machines, wherein the rotor bearings are suspended axially and radially in housings within a motor stator housing, permits the motor/generator to be modularly separated from its load. For example, each element of the motor may be mechanically coupled as to be independently maintainable from the other, while the other element is not unnecessarily disturbed. The effect is to reduce the time and cost to repair or replace a defective element.

In some embodiments, the shaft in the motor (e.g., the motor shaft) may be separate from a pump shaft connected to the impellers (e.g., via collets and interference fit). For example, the motor shaft may be selectively coupled to the pump shaft in order to remove and/or install the motor. In some embodiments, the motor shaft and pump shaft may be coupled using complementary spline fittings on adjoining portions of the motor and pump shafts. In additional embodiments, the shaft may be a single shaft (e.g., a monolithic shaft) extending through the motor and into the pump in order to support the impellers.

In some embodiments, the motor/generators in accordance with some embodiments of the disclosure are of the permanent magnet pole type that permit the power density of the units to be increased, enabling the units to be lighter and more conveniently maintained.

In some embodiments, the motors/generators may include runup/rundown bearings within the motor/generator that are designed to stabilize the dynamics of the rotating elements during startup and shutdown.

Embodiment of the present disclosure include a vertical-axis electric motor or generator that may be used to drive or be driven by fluid handling devices or machines, such as centrifugal pumps, turbines, mixers, blowers, etc. in a cryogenically cold, environment potentially electrically hazardous environments.

In such harsh environments, embodiments the motors/generators may be implemented in pressure vessels that are designed to provide containment of a potentially flammable or explosive hazardous fluid by isolating the pumped fluid from the oxygen in atmospheric air, thereby removing one of the three conditions needed for combustion or explosion.

Further, submerging the motor/generator including associated electrical components in the very cold pumped fluid may reduce electrical resistance losses and reduce the loss pumped fluid to boiloff.

In some embodiments of the disclosure, the motors/generators may require that all components are suitable for operation within a working temperature range of 75-200 K. In such an embodiment, the housing components are designed to maintain structural integrity and provide leak proof containment at specified working pressures from 1 bara (e.g., bar) to 160 bara. Further, the electrical insulation is designed to be suitable for operation at 1,000-15,000 VAC and 25-333 Hz.

In some embodiments, the bearings of the motor may be selected to be suitable for a life of 25,000 hours (e.g., mean time between outages (MTBO)). Further, the electrical machines are required to meet the requirements of all bodies having code jurisdiction over the application in the service area, as qualified by suitable design reviews, testing and shall be certified to be such, by the manufacturers and or qualified third-party inspection agencies.

In some embodiments, the electric motors may be used as generators by applying a level of torque to the shaft of a motor that causes the "back electro-magnetic force," measured in volts, to exceed the electric and magnetic fields (EMF) of the power system to which the machine is connected. Similarly, a generator, when connected to such a power system, can be configured to serve as a motor when the back EMF is less than that of the system.

In non-cryogenic applications, induction motors and/or generators are generally constructed of large heavy steel or cast-iron frames supporting laminated steel magnetic stators, into which are inserted high starting-current windings (e.g., also referred to as stator coils). These machines embody high-inertia rotors that, when the unit is energized, will operate at a rotative speed slightly less than the source-frequency speed. Accordingly, these machines are generally designated as asynchronous. When the shaft of such a machine is forced to rotate at a speed rotative speed that exceeds the source-frequency speed, the machine becomes an asynchronous generator.

Embodiments of the present disclosure may be referred to as a synchronous motor/generator because their construction is such that the rotational speed of the machines is synchronized (e.g., always synchronized) with the line frequency of the source power system to which the machine is connected.

Moreover, the strength of the magnetic forces which drive the machines in accordance with embodiments of the disclosure are significantly greater than those found in conventional prior art, enabling the mass of the machine frames to be significantly reduced. Additionally synchronous permanent magnet rotor poles may permit the mass of motor/generator poles to be reduced and current controlled windings driven by variable frequency drives are enabled to follow the demand of the load. Such configurations may assist in reducing the mass of those elements and eliminating losses of unneeded energy, in turn reducing operating costs.

An alternating current permanent magnet motor or generator type will generally rotate at a speed in revolutions per minute (RPM) that is synchronized with the frequency of its power supply system, which may be calculated by multiplying the supply frequency in cycles per second times one-hundred and twenty (120) divided by total number of magnetic poles of the machine rotor. For instance, in a system operating at 160 Hz cycles/second, a four-pole motor or generator will rotate at 160×120/4=4800 RPM. In some embodiments, the motor may be configured to rotate relatively fast than convention motors, for example, 2,000 through 10,000 RPM, above 4000 RPM, above 5000 RPM, above 6000 RPM, or above 7000 RPM.

If the frequency of the power supply is controlled, the speed of the motor may be synchronously adjusted. The power system frequency controller may be a variable frequency drive and, accordingly, the machine being controlled may be referred to as a variable speed synchronous motor or generator in accordance with embodiments of the disclosure.

Similarly, if such a machine is designed to operate in a power system where the supply electro-motive force is the range between 1,000 Volts to 15,000 Volts (e.g., 3,300 Volts to 6,600 Volts), such a system is said to be a medium voltage system and the machine is said to be a medium voltage motor or generator in accordance with embodiments of the disclosure.

Figure 1:
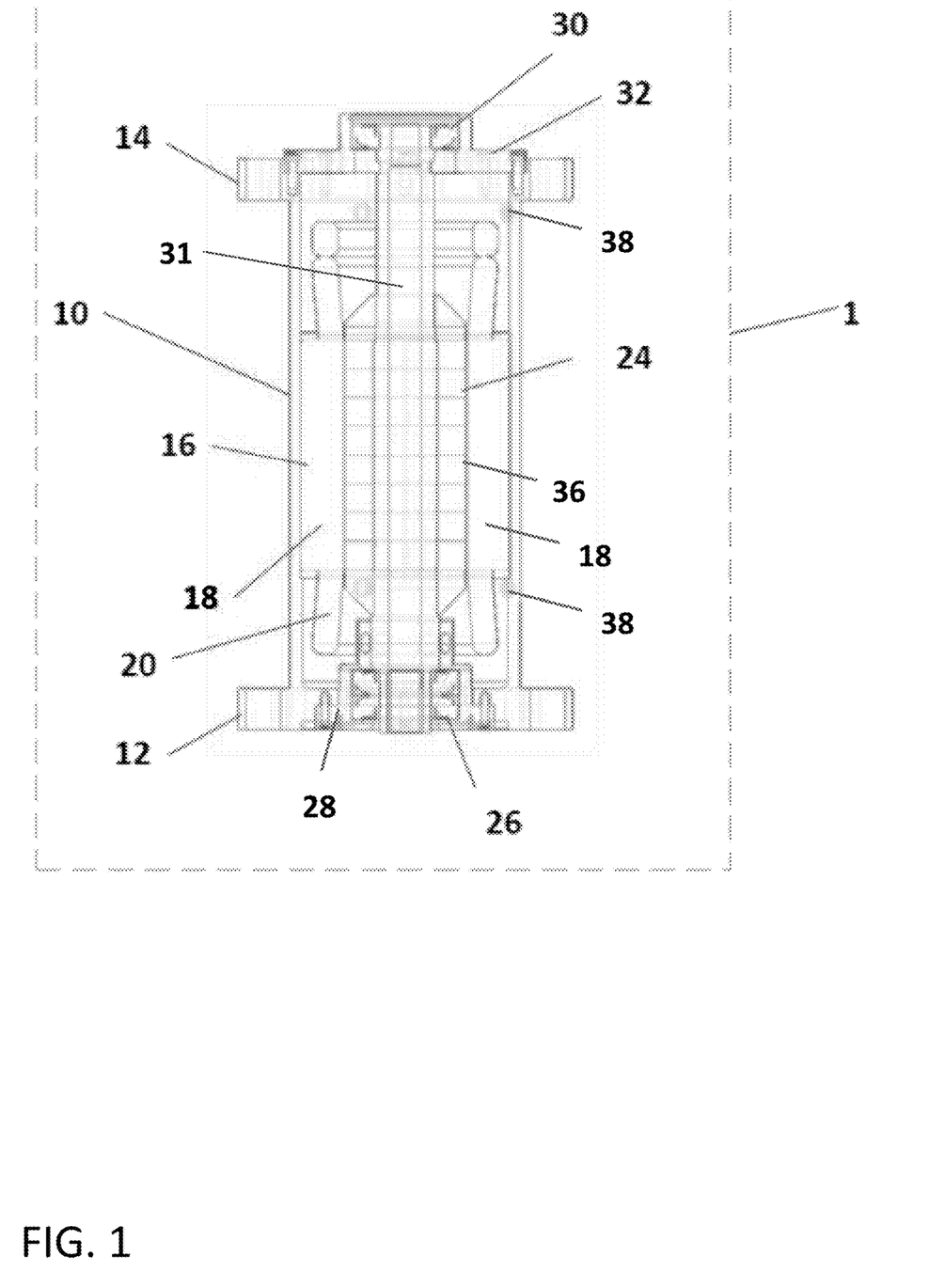
FIG. 1 is an elevational cross-sectional view of a modular submerged motor/generator in accordance with an embodiment of the disclosure.

FIG. 1 is an elevational cross-sectional view of a modular submerged motor/generator. Referring to FIG. 1, in some embodiments of the disclosure, modular medium voltage synchronous submerged motor/generator module 1 comprises an outer structural cylindrical module housing 10 at the lower edge of which a concentrically and perpendicularly mounting flange 12 is affixed and to which, at its upper edge, is a similarly affixed an upper mounting flange 14. Within the cylindrical module housing 1 an electrical stator 16 is concentrically mounted. The electrical stator 16 may be comprised of a laminated cylindrical stack 18 of a special magnetic steel discs compressed to remove any gaps between laminations and secured according to any suitable method. Notches of the housing 10, when correctly aligned, form axial channels into which an array of formed or random wound electrical coils 20 are inserted as required to define the desired number of electromagnet poles of the stator 16. The coils 20 are connected and electrical leads 22 (FIG. 2) are applied as required by the design of the motor/generator.

A permanent magnet rotor 24 (e.g., having four magnetic poles) is coupled to a shaft 31 (e.g., drive shaft) and suspended between the lower thrust bearing 26 and the upper radial bearing 30 with the shaft 31 extending through and supported by the lower thrust bearing 26 and the upper radial bearing 30.

In some embodiments, the rotor 24 may be slidably coupled to the drive shaft 31 such that the drive shaft 31 will rotate with the rotor 24, but the drive shaft 31 may move in an axial direction relative to the rotor 24 during operation of the cryogenic pump/generator. Accordingly, the motor 1 may be utilized to power the rotation of the drive shaft 31 through the slidable connection with the rotor 24, but the drive shaft 31 may slide and move in and axial direction (e.g., a direction parallel to the axis of rotation of the drive shaft 31) relative to the rotor 24 so that the drive shaft 31 may move axially independently of the rotor 24. In some embodiments, the rotor 24 may be coupled to the drive shaft 31 with a splined coupling wherein the splines extend parallel to (e.g., along) the axis of rotation of the drive shaft 31 to facilitate the transfer or torque between the rotor 24 and the drive shaft 31 while allowing the drive shaft 31 to slide and move in an axial direction relative to the rotor 24.

The lower thrust bearing 26 may be located in a lower bearing housing 28 which is secured by bolting to the lower mounting flange 12. In some embodiments, the lower bearing housing 28 may be part of the motor housing 10. As depicted, the lower bearing housing 28 may be at least partially (e.g., a majority being received, entirely received) in the motor housing 10. The lower bearing housing 28 may be coupled to and received in the motor housing 10 to position the lower thrust bearing 26 within (e.g., a majority within, entirely within) the motor housing 10.

The upper radial bearing 30 may be mounted in the pump upper bearing housing 32 and secured by bolting to the upper mounting flange 14 in axial and radial alignment with the magnet centers of the stator 16. In some embodiments, the upper bearing housing 32 may be part of the motor housing 10. As depicted, the upper bearing housing 32 may be coupled to an end of the motor housing 10.

In some embodiments, one or both of the lower thrust bearing 26 and the upper radial bearing 30 may accommodate axial movement of the rotor 24 (and/or shaft 31 within the rotor 24). For example, by enabling the rotor 24 to slide through the lower thrust bearing 26 and/or the upper radial bearing 30 and/or by moving axially with the rotor 24 and/or shaft 31 in and relative to the pump upper bearing housing 32.

In operation, the interior cavity of module housing 10 is filled with the species of pumpage which generally flows through passages in and around thrust bearing 26. The fluid may then flow through an annular path upwards through magnetic gap 36 exiting module housing 10 to the annular space surrounding said module via a plurality of active or passive pressure regulators 38. This flow of pumpage through module 10 carries heat generated by the operation of the thrust bearing and the fluid friction in the magnetic gap away, thus cooling the lower portion of the module 1.

In some embodiments, the thrust bearing 26 may include an assembly of bearings for supporting the rotor 24 in multiple axes. For example, the thrust bearing 26 may include two angular contact or thrust bearings positioned in opposition to each other to support axial forces applied to the rotor in both axial directions along a rotational axis of the rotor 26.

Figure 2:
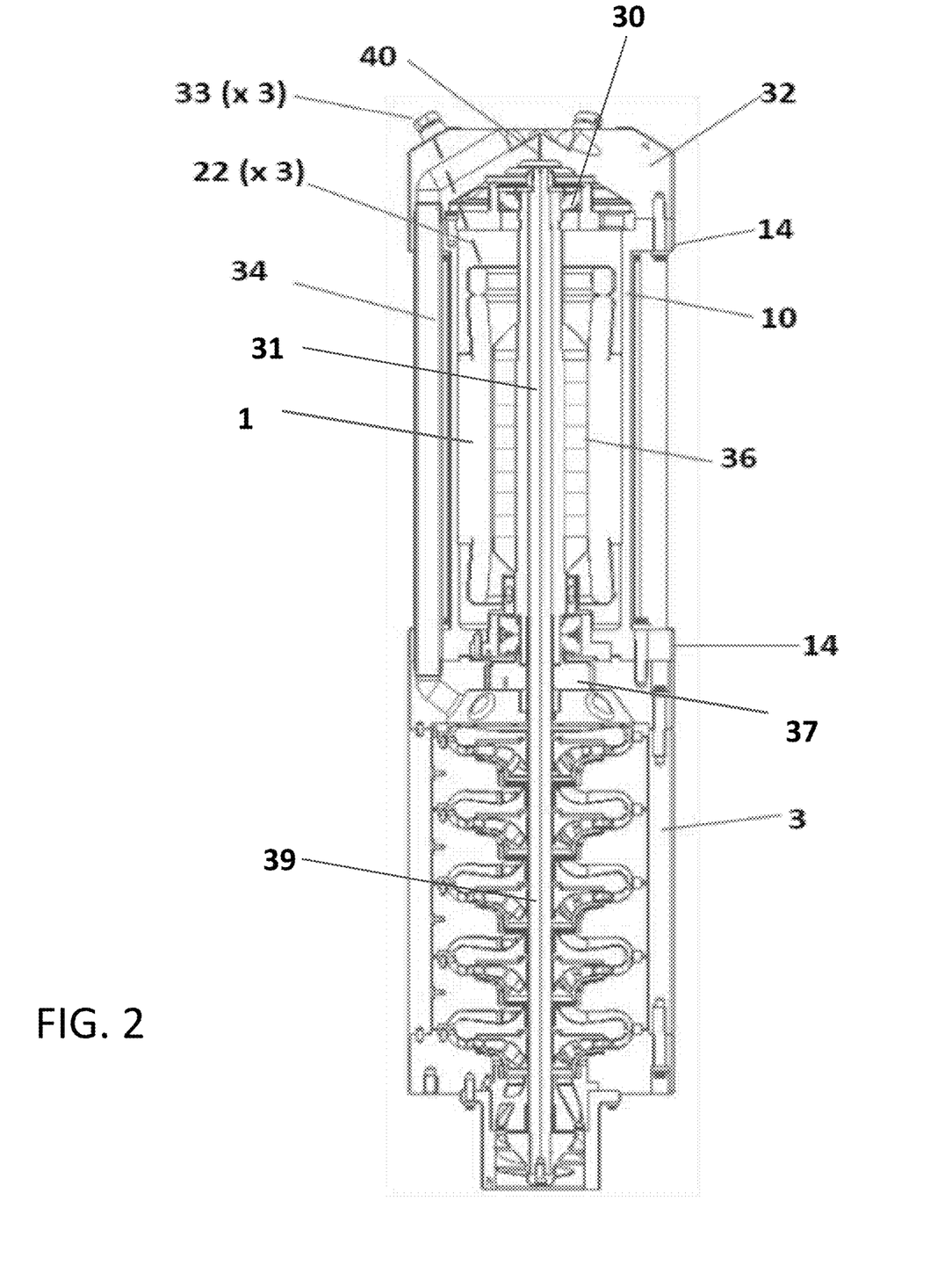
FIG. 2 is an elevational cross-sectional view of the general arrangement of modular submerged motor/generator as assembled to a hydraulic module to complete the modular submerged motor pump or submerged generator cryogenic energy recovery turbine unit in accordance with an embodiment of the disclosure.

FIG. 2 is an elevational cross-sectional view of the general arrangement of modular submerged motor/generator as assembled to a hydraulic module to complete the modular submerged motor pump or submerged generator cryogenic energy recovery turbine unit. Referring to FIG. 2, an embodiment of the module housing includes a plurality of flow bypass tubes 34, the number and diameter of which is determined based on the total volume of liquid natural gas (LNG) or other species of pumpage to be transported.

A complementary flow of pumpage enters the module, through an orifice 40 in discharge manifold/upper motor cover 32, thence downward through passages in and around radial bearing 30 cooling the upper portion of motor/generator module 1 and exiting housing 10 through pressure regulators 38 of FIG. 1 (e.g., four pressure regulators 38 on each axial side of the motor/generator module 1).

As should be appreciated, embodiments of the module housing 10 will be influenced by the configuration of the hydraulic module 3. In some instances, the flow bypass tubes 34 may be eliminated and the discharge flow will be directed into the annular space between the shell of pressure vessel 52 of FIG. 3 and the module outer housing 10. In such a case, mounting flange 12 and upper mounting flange 14 may be eliminated and the thickness of the housing would be increased to permit the attachment of the hydraulic module to the lower extremity of housing 10 and discharge manifold/upper motor cover 32 to the upper extremity of housing 10.

In some of the described embodiments, structural components may be fabricated and/or machined, for example, from wrought plate and/or forged billets (e.g., of type 6061-T6 aluminum alloy). Further, rotor shafts may be fashioned of a lightly magnetic martensitic stainless steel (e.g., type 15-5 in condition HH1150) and electrical laminations are stamped or cut from a suitable electrical lamination steel.

Permanent magnet poles are formed by hot isostatic pressing rare earth powder metal such as samarium-cobalt (SmCo), neodymium (NdFeB), or praseodymium-nickel and secured to or within the periphery of the rotor 24. Three phase, medium voltage, alternating current is applied to the modular submerged motor 1, or to the system by the generator 1 through three single-phase insulated power connector bushings 33 each configured to provide a secure, non-sparking connection of the winding leads to each incoming power cables 34.

Incoming power connector bushings 33 for supplying power to motors are conventionally male gendered and those for receiving power from generators are conventionally female gendered.

In some embodiments, the assembly may include an active thrust balance element (e.g., balance drum 37) configured to at least partially counteract one or more axial forces applied to the rotor. In some embodiments, the slidable coupling between the rotor 24 and the drive shaft 31 may enable axial movement of the balance drum 37, which is rigidly coupled to the drive shaft 31.

Figure 3:
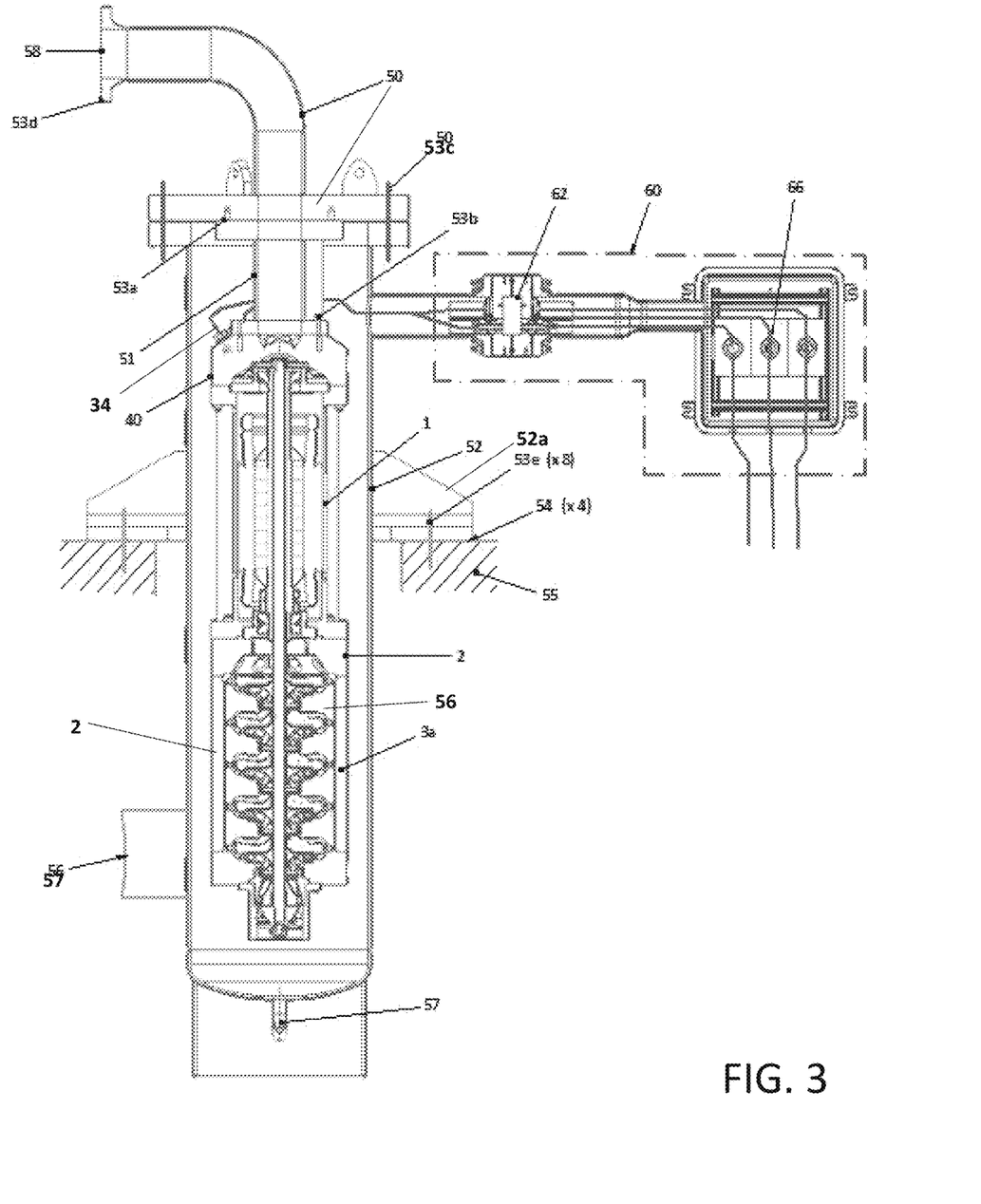
FIG. 3 is an elevational partial cross-sectional of a pressure vessel with a modular motor/generator as it will be installed in a system showing the motor/generator as incorporated within a modular submerged motor pump or a cold energy recovery turbine in accordance with an embodiment of the disclosure.

FIG. 3 is an elevational partial cross-sectional of a pressure vessel with a modular motor/generator as it will be installed in a system showing the motor/generator as incorporated within a modular submerged motor pump or a cold energy recovery turbine. Referring to FIG. 3, in some embodiments, a modular submerged motor pump 1 or submerged generator CERT 1, is suspended from pressure vessel headplate 50 being secured to the headplate 50, at its underside at the upper extremity of discharge spool 51 by a plurality of fasteners 53*a* of a suitable number and kind and similarly, by a plurality of fasteners, at the lower extremity of said discharge spool to discharge manifold 32 of FIG. 2. As depicted, the motor/generator 1 is connected to a fluid handling device, such as pump/turbine 3*a* (e.g., via an upper pump/turbine 3*a* housing 2 that includes a stack of impellers and diffusers 56 in a stacked configuration.

Pressure vessel headplate 50 is supported, secured and sealed to pressure vessel 52 by a plurality of fasteners 53*c*.

Pressure vessel 52 embodies several integral mounting struts 52*a* each being secured to foundation 55 by suitable anchor bolts 53*e* and thermally insulated therefrom, each by a thermal barrier 54.

In some embodiments of the disclosure, the modular SMP 1 pumpage enters pressure vessel 52 through suction nozzle 57 and is discharged into the process piping system at discharge nozzle 58 at suitable location.

In some embodiments, the motor pump or generator 1 may be powered by an electrical feedthrough 60 including a power junction box 66. The electrical feedthrough 60 may include one or more process seals 62 for at least partially isolating the cryogenic environment from the ambient environment.

Figure 4:
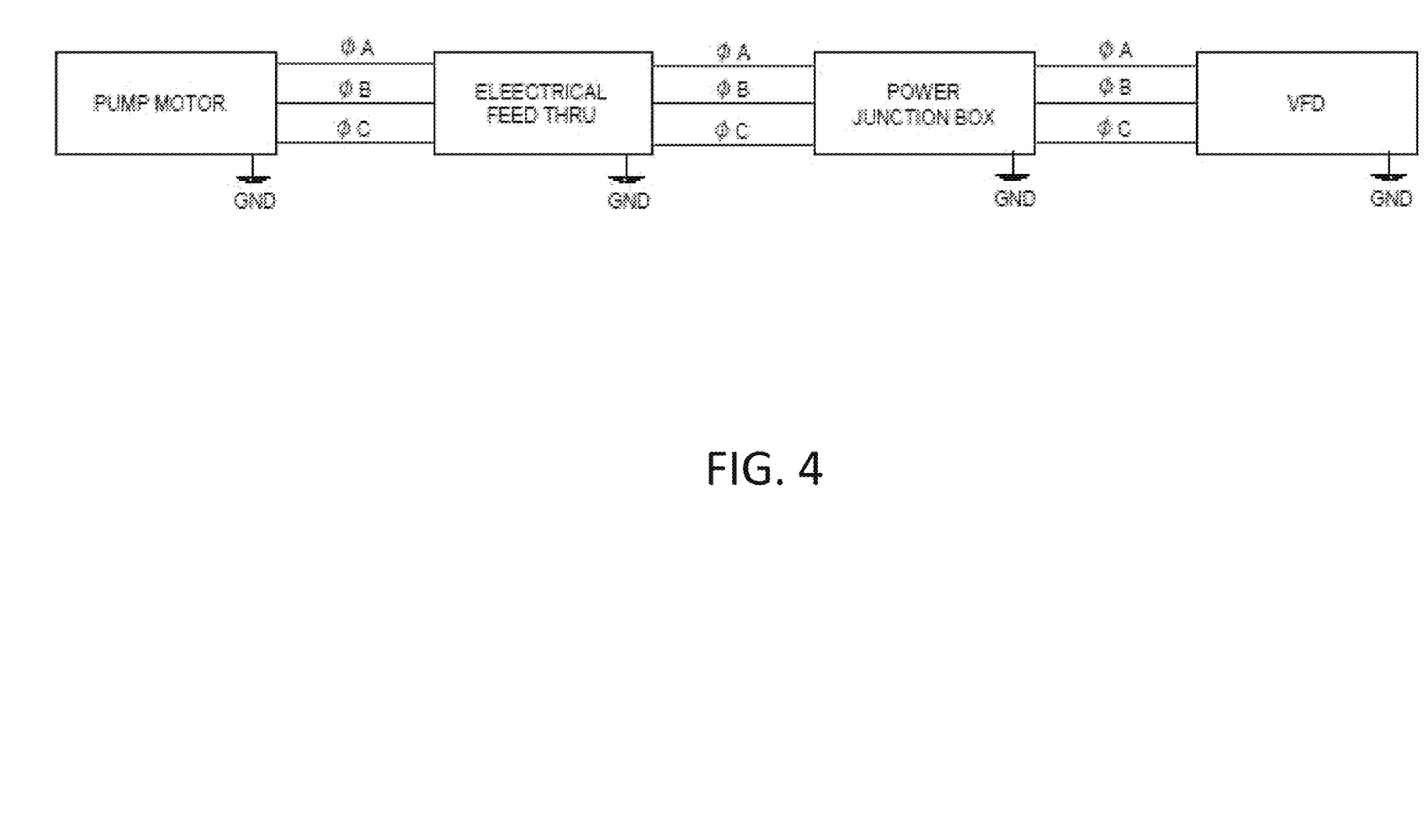
FIG. 4 is a flowchart showing interfaces between a modular submerged motor/generator and electrical power and control systems in accordance with an embodiment of the disclosure.

FIG. 4 is a flowchart showing interfaces between a modular submerged motor/generator and electrical power and control systems. As shown in FIGS. 3 and 4, the electrical connection 60 between the permanent magnet motor 1 and the variable frequency drive with the intermediate seal 62 and junction box 66 may include connections for each phase (e.g., three motor phases (A, B, & C)) plus a ground (GND).

While the present disclosure has been described herein with respect to certain illustrated embodiments, those of ordinary skill in the art will recognize and appreciate that it is not so limited. Rather, many additions, deletions, and modifications to the illustrated embodiments may be made without departing from the scope of the disclosure as hereinafter claimed, including legal equivalents thereof. In addition, features from one embodiment may be combined with features of another embodiment while still being encompassed within the scope of the disclosure as contemplated by the inventors.

What is claimed is:

1. A motor assembly for use in fluid handling device, comprising:
    a motor housing;
    a motor comprising a rotor and a stator contained in the motor housing, the motor comprising an alternating current medium voltage synchronous motor, the rotor configured to rotate a shaft connected to impellers of the fluid handling device while the shaft moves axially relative to the rotor during operation of the fluid handling device;
    wherein the shaft may move axially independently of the rotor;
    a first bearing assembly coupled to a first end of the motor housing; and a second bearing assembly coupled to a second end of the motor housing and positioned at least partially within the motor housing.

2. The motor assembly of claim 1, wherein the alternating current medium voltage synchronous motor is configured to be driven at 1,000 Volts to 15,000 Volts and at a rotational speed between 2,000 RPM and 10,000 RPM.

3. The motor assembly of claim 2, wherein the alternating current medium voltage synchronous motor is configured to be driven at 3,300 Volts to 6,600 Volts.

4. The motor assembly of claim 1, wherein the alternating current medium voltage synchronous motor is configured to be driven by a variable frequency drive.

5. The motor assembly of claim 1, wherein the motor housing, the first bearing assembly, and the second bearing assembly are configured to be installed and/or removed as a unit in a submergible cryogenic pump.

6. The motor assembly of claim 1, wherein the first bearing assembly is contained within a first bearing housing that is coupled to the motor housing.

7. The motor assembly of claim 1, wherein the second bearing assembly is contained within a second bearing housing that is coupled to the motor housing to position the second bearing assembly within the motor housing.

8. The motor assembly of claim 7, wherein the second bearing housing is positioned within the motor housing.

9. The motor assembly of claim 1, wherein the first bearing assembly comprises a radial guide bearing and the second bearing assembly comprises one or more contact bearings configured to support an axial force applied to the rotor.

10. The motor assembly of claim 9, wherein the second bearing assembly comprises two angular contact bearings positioned in opposition to each other to support axial forces applied to the rotor in both axial directions along a rotational axis of the rotor.

11. The motor assembly of claim 1, wherein the motor is configured to operate as a power generator without any substantial external electrical power being supplied to the motor.

12. A submergible cryogenic pump comprising:
fluid handling stages comprising impellers mounted to a shaft at least partially encompassed by one or more diffusers; and
a motor assembly for transferring force to and/or receiving force from the fluid handling stages via the shaft, the motor assembly comprising:
a motor housing; and
a motor comprising a rotor and a stator contained in the motor housing, the rotor configured to rotate the shaft while the shaft moves axially relative to the rotor,
wherein the shaft may move axially independently of the rotor;
the motor further comprising an alternating current medium voltage synchronous motor configured to be driven at 1,000 Volts to 15,000 Volts and at a rotational speed between 2,000 RPM and 10,000 RPM.

13. The submergible cryogenic pump of claim 12, further comprising a bearing assembly for supporting the shaft, the bearing assembly comprising a pair of angular antifriction rolling elements configured and arranged such that one element opposes momentary axial forces in a first direction and another element opposes momentary axial forces in a second, opposing direction.

14. The submergible cryogenic pump of claim 13, wherein the bearing assembly is configured to restrain axial range of dynamic motion of the shaft to approximately 2 mm.

15. The submergible cryogenic pump of claim 12, wherein the alternating current medium voltage synchronous motor is configured to be driven with a variable frequency drive.

16. The submergible cryogenic pump of claim 12, wherein the shaft comprises a pump shaft coupled to the impellers and a drive shaft coupled to the rotor, the pump shaft being removable from the drive shaft.

17. A method of transferring electrical energy between a motor assembly and a fluid handling device, the method comprising:
moving a plurality of fluid handling stages comprising impellers mounted to a shaft at least partially within one or more diffusers;
supporting the shaft with a first bearing assembly comprising a radial bearing and a second bearing assembly comprising at least two angled bearings for supporting loads in both axial directions of the shaft;
transferring force to and/or receiving force from the plurality of fluid handling stages via the shaft with a motor assembly comprising an alternating current medium voltage synchronous motor and moving the shaft in an axial direction relative to the motor assembly during operation,
wherein the shaft may move axially independently of the rotor.

18. The method of claim 17, further comprising driving the alternating current medium voltage synchronous motor at 1,000 Volts to 15,000 Volts and at a rotational speed between 2,000 RPM and 10,000 RPM.

19. The method of claim 17, further comprising driving the alternating current medium voltage synchronous motor at 3,300 Volts to 6,600 Volts with a variable frequency drive.

20. The method of claim 17, further comprising installing and/or removing the motor assembly, the first bearing assembly, and the second bearing assembly as an assembled unit.

* * * * *